United States Patent
Chen et al.

(10) Patent No.: US 7,861,141 B2
(45) Date of Patent: Dec. 28, 2010

(54) METHOD AND DEVICE FOR ERROR ANALYSIS OF OPTICAL DISC

(75) Inventors: Hsin-cheng Chen, Tainan County (TW); Ching-wen Hsueh, Yilan County (TW)

(73) Assignee: MEDIATEK Inc., Hsin-Chu (TW)

( * ) Notice: Subject to any disclaimer, the term of this patent is extended or adjusted under 35 U.S.C. 154(b) by 983 days.

(21) Appl. No.: 11/357,323

(22) Filed: Feb. 17, 2006

(65) Prior Publication Data

US 2007/0094573 A1    Apr. 26, 2007

Related U.S. Application Data

(60) Provisional application No. 60/729,279, filed on Oct. 21, 2005.

(51) Int. Cl.
G11C 29/00    (2006.01)

(52) U.S. Cl. .................. 714/769; 714/768; 714/763

(58) Field of Classification Search ............. 714/762, 714/768, 769
See application file for complete search history.

(56) References Cited

U.S. PATENT DOCUMENTS

| | | | |
|---|---|---|---|
| 4,316,223 A | 2/1982 | Baldwin et al. | |
| 5,452,429 A * | 9/1995 | Fuoco et al. | 714/6 |
| 5,487,077 A * | 1/1996 | Hassner et al. | 714/762 |
| 5,528,608 A * | 6/1996 | Shimizume | 714/765 |
| 5,761,642 A | 6/1998 | Suzuki et al. | |
| 5,909,541 A * | 6/1999 | Sampson et al. | 714/6 |
| 6,018,304 A * | 1/2000 | Bessios | 341/58 |
| 6,308,004 B2 * | 10/2001 | Kawamura et al. | 386/95 |
| 6,357,030 B1 * | 3/2002 | Demura et al. | 714/755 |
| 6,385,249 B1 | 5/2002 | Kondo et al. | |
| 6,615,387 B1 * | 9/2003 | Williamson et al. | 714/785 |
| 6,697,976 B1 | 2/2004 | Satoh et al. | |
| 6,928,125 B2 | 8/2005 | Nakano et al. | |
| 2002/0099996 A1 | 7/2002 | Demura et al. | |
| 2003/0103429 A1 | 6/2003 | Senshu | |
| 2005/0210045 A1 | 9/2005 | Park | |
| 2005/0229081 A1 | 10/2005 | Lin et al. | |

* cited by examiner

*Primary Examiner*—M. Mujtaba K Chaudry

(57) ABSTRACT

A method and device for error analysis particularly adoptable for a recording medium such as an optical disc are disclosed. The present invention executes an encoding-like operation such as an interleaving operation to error flags during reproducing data from the optical disc, so as to obtain number and distribution of the errors on the disc.

11 Claims, 16 Drawing Sheets

FIG. 13

| | ← | | 182 columns | | | | → L' |
|---|---|---|---|---|---|---|---|
| | $G_{0,0}$ | $G_{0,1}$ | ... | $G_{0,170}$ | $G_{0,171}$ | $G_{0,172}$ | ... | $G_{0,181}$ |
| | $G_{0,182}$ | $G_{0,183}$ | ... | $G_{0,352}$ | $G_{0,353}$ | $G_{0,354}$ | ... | $G_{0,363}$ |
| | $G_{1,0}$ | $G_{1,1}$ | ... | $G_{1,170}$ | $G_{1,171}$ | $G_{1,172}$ | ... | $G_{1,181}$ |
| | $G_{1,182}$ | $G_{1,183}$ | ... | $G_{1,352}$ | $G_{1,353}$ | $G_{1,354}$ | ... | $G_{1,363}$ |
| | | | | | | | |
| | $G_{5,0}$ | $G_{5,1}$ | ... | $G_{5,170}$ | $G_{5,171}$ | $G_{5,172}$ | ... | $G_{5,181}$ |
| | $G_{5,182}$ | $G_{5,183}$ | ... | $G_{5,352}$ | $G_{5,353}$ | $G_{5,354}$ | ... | $G_{5,363}$ |
| | $G_{192,0}$ | $G_{192,1}$ | ... | $G_{192,170}$ | $G_{192,171}$ | $G_{192,172}$ | ... | $G_{192,181}$ |
| | $G_{6,0}$ | $G_{6,1}$ | ... | $G_{6,170}$ | $G_{6,171}$ | $G_{6,172}$ | ... | $G_{6,181}$ |
| | $G_{6,182}$ | $G_{6,183}$ | ... | $G_{6,352}$ | $G_{6,353}$ | $G_{6,354}$ | ... | $G_{6,363}$ |
| | $G_{7,0}$ | $G_{7,1}$ | ... | $G_{7,170}$ | $G_{7,171}$ | $G_{7,172}$ | ... | $G_{7,181}$ |
| 416 rows | $G_{7,182}$ | $G_{7,183}$ | ... | $G_{7,352}$ | $G_{7,353}$ | $G_{7,354}$ | ... | $G_{7,363}$ |
| | | | | | | | |
| | $G_{11,0}$ | $G_{11,1}$ | ... | $G_{11,170}$ | $G_{11,171}$ | $G_{11,172}$ | ... | $G_{11,181}$ |
| | $G_{11,182}$ | $G_{11,183}$ | ... | $G_{11,352}$ | $G_{11,353}$ | $G_{11,354}$ | ... | $G_{11,363}$ |
| | $G_{192,182}$ | $G_{192,183}$ | ... | $G_{192,352}$ | $G_{192,353}$ | $G_{192,354}$ | ... | $G_{192,363}$ |
| | | | | $G_{R,L}$ | | | |
| | $G_{186,0}$ | $G_{186,1}$ | ... | $G_{186,170}$ | $G_{186,171}$ | $G_{186,172}$ | ... | $G_{186,181}$ |
| | $G_{186,182}$ | $G_{186,183}$ | ... | $G_{186,352}$ | $G_{186,353}$ | $G_{186,354}$ | ... | $G_{186,363}$ |
| | $G_{187,0}$ | $G_{187,1}$ | ... | $G_{187,170}$ | $G_{187,171}$ | $G_{187,172}$ | ... | $G_{187,181}$ |
| | $G_{187,182}$ | $G_{187,183}$ | ... | $G_{187,352}$ | $G_{187,353}$ | $G_{187,354}$ | ... | $G_{187,363}$ |
| | | | | | | | |
| | $G_{191,0}$ | $G_{191,1}$ | ... | $G_{191,170}$ | $G_{191,171}$ | $G_{191,172}$ | ... | $G_{191,181}$ |
| | $G_{191,182}$ | $G_{191,183}$ | ... | $G_{191,352}$ | $G_{191,353}$ | $G_{191,354}$ | ... | $G_{191,363}$ |
| ↓ R' | $G_{207,182}$ | $G_{207,183}$ | ... | $G_{207,352}$ | $G_{207,353}$ | $G_{207,354}$ | ... | $G_{207,363}$ |

FIG. 14

METHOD AND DEVICE FOR ERROR ANALYSIS OF OPTICAL DISC

CROSS-REFERENCE TO RELATED APPLICATIONS

This application claims priority to and incorporates by reference the disclosure set forth, in its entirety, in U.S. Provisional Patent Application No. 60/729,279, entitled "AN INFORMATION RECORDING AND REPRODUCING APPARATUS WITH ERROR ANALYZER" filed Oct. 21, 2005.

TECHNICAL FIELD OF THE INVENTION

The present invention relates to error analysis, more specifically, for a method and device for analyzing errors in a recording medium such as an optical disc.

BACKGROUND OF THE INVENTION

It is advantageous to know the quality of a recording medium, for example, an optical disc such as a CD, DVD+, DVD-, DVD-RAM, HD-DVD, Blu-ray disc or the like. A method to know the disc quality well is to obtain the number and distribution of errors in the disc. From error analysis, errors due to a recording apparatus or the disc per se can be distinguished. The respective manufacturers of the recording apparatus and the disc can improve their products according to result of the error analysis.

Generally, when an optical disc is read by a disc drive, a kind of errors so called "burst errors" in the present invention are essentially caused by defects of the disc per se. In contrast, another kind of errors so called "random errors" are mainly caused by the recording apparatus. For monitoring the recording or writing quality, it is necessary to omit the burst errors due to the inherent disc defects when calculating the total errors.

An erroneous byte is a data byte in which at least one bit is of a wrong value. An error burst is defined as a sequence of bytes in which there are not more than a predetermined number m (m=2 in a usual case) correct bytes between any two erroneous bytes. A length of the error burst is defined as the total number of bytes counted from a first erroneous byte separated by a series of continuous correct bytes, which has at least m+1 (3 in a usual case) correct bytes to a final erroneous byte also separated by at least m+1 (3 in a usual case) continuous correct bytes. FIG. 1 is a diagram schematically illustrating an example of an error burst of an optical disc. In this example, the length of the error burst is 10 bytes. In addition, the number of the erroneous bytes in this error burst is 7.

An error burst of a length longer than or equal to n (n=40 in a usual case) bytes can be referred to a burst error. On the other hand, an error burst of a length less than 40 bytes is referred to a random error. There is a need for a method to obtain information of the different types of errors during data reproduction. The error profile such as the numbers and distribution of different types of errors including burst errors and random errors can be used to estimate the recording or writing quality or other applications.

SUMMARY OF THE INVENTION

An objective of the present invention is to provide a method for error analysis, which is particularly adoptable for a recording medium such as an optical disc. The method in accordance with the present invention is to execute an encoding-like operation to error flags during decoding data of the optical disc, so as to obtain number and distribution of the errors.

Another objective of the present invention is to provide a device for error analysis, which is particularly adoptable for a recording medium such as an optical disc. The apparatus in accordance with the present invention has a unit for executing an encoding-like operation to error flags during decoding data of the optical disc, so as to obtain number and distribution of the errors.

In accordance with an aspect of the present invention, the method for error analysis of an optical disc includes obtaining error information such as error flags of data recorded on the optical disc; writing the error information to a buffer and reading the error information from the buffer, so that the read error information is of a format as the data recorded on the disc; and analyzing the read error information. Specifically, the data recorded on the disc is de-interleaved during reproduction. In the method of the present invention, the error flags are interleaved, and the interleaved error flags are calculated, so that the number and distribution of the errors can be obtained and used in statistics and/or analysis for the errors of the optical disc.

In accordance with another aspect of the present invention, the device for error analysis of an optical disc includes an interleave unit and an error rate controller. In reproducing data recorded on the optical disc, which is processed by a de-interleaving operation, the error rate controller receives error information of the data and requests the interleave unit to conduct an interleaving operation to the error information such as error flags. The interleaved error information can be used in statistics and/or analysis for the errors of the disc.

BRIEF DESCRIPTION OF THE DRAWINGS

The present invention will be further described in detail in conjunction with the accompanying drawings, wherein:

FIG. 13 shows a configuration of a HD-DVD ECC block;

FIG. 14 shows a configuration of a HD-DVD ECC block error flag map;

DETAILED DESCRIPTION OF THE INVENTION

The present invention will be described in details in conjunction with the drawings.

A symbol error rate (SER), which is used in error analysis, is defined as the total number of all erroneous bytes in respective data units (e.g. ECC clusters) divided by the total number of bytes in those data units as represented by the following equation:

$$SER = \frac{\sum_{i=1}^{N} \text{number of all erroneous bytes in } ECC \text{ Cluster } i}{N \times M} \quad (1)$$

Here, M is the total number of data bytes in one ECC cluster. For example, under the Blu-Ray standard, the total number of data bytes in one ECC cluster is 76880, and hence M is 76880.

Further, a random symbol error rate (RSER), which is also useful in error analysis, is calculated by excluding the error bursts with lengths thereof longer than or equal to n bytes (i.e. the burst errors, where n=40 in a usual case)) as represented by the following equation:

$$RSER = \frac{\sum_{i=1}^{N} (\text{number of all erroneous bytes} - \text{number of all erroneous bytes in bursts} \geq n \text{ bytes}) \text{ in } ECC \text{ Cluster } i}{N \times M - \sum_{i=1}^{N} \text{number of all erroneous bytes in bursts} \geq n \text{ bytes in } ECC \text{ Cluster } i} \quad (2)$$

Figure 1:
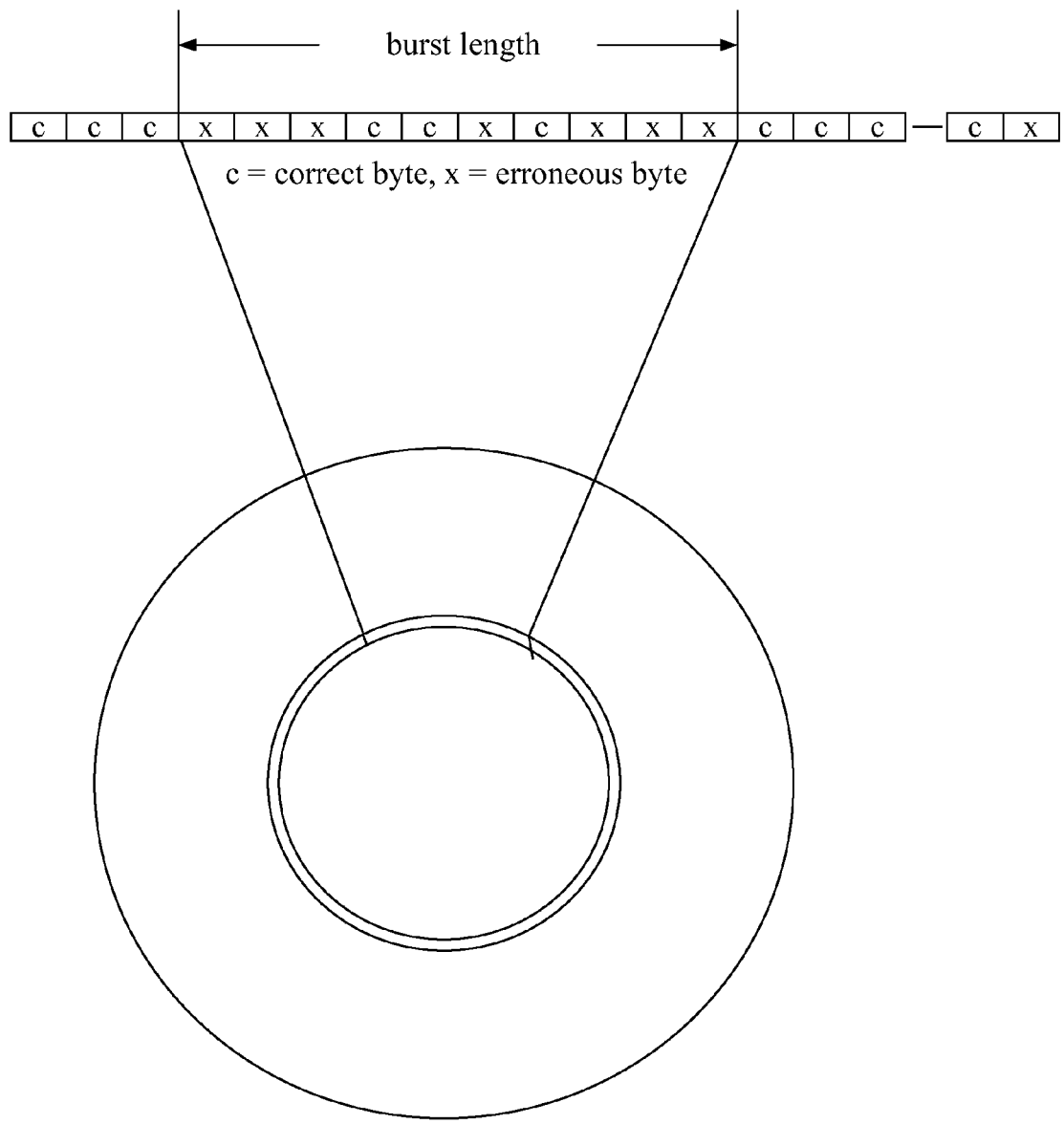
FIG. 1 is a diagram schematically illustrating an example of an error burst of an optical disc.
Figure 2:
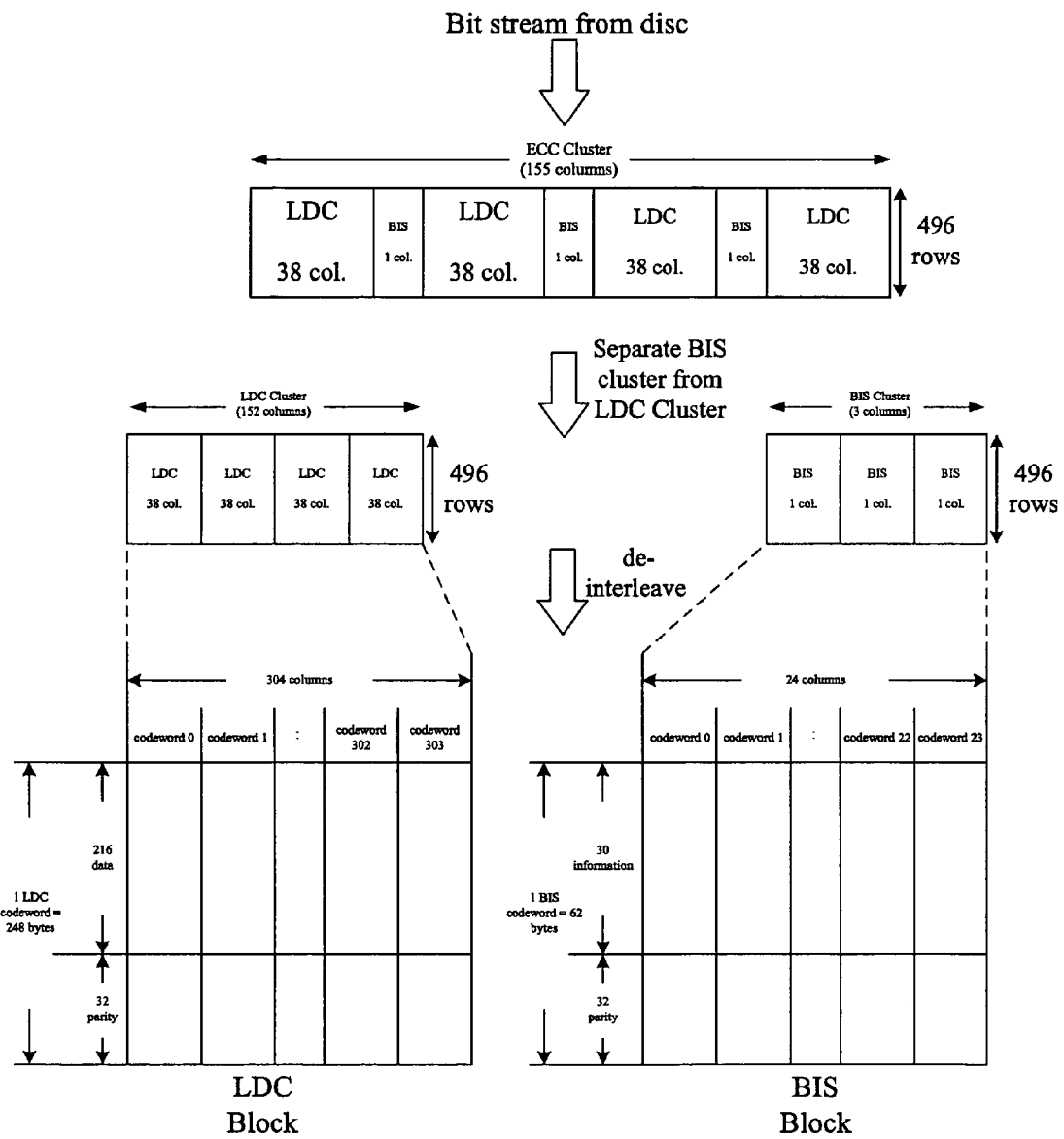
FIG. 2 is an illustration showing data reproduction for a blu-ray disc.

FIG. 2 shows data formats of a blu-ray disc in respective stages during data reproduction. As shown, in reproducing data from the disc, data bit stream read from the disc is demodulated into ECC cluster format. An ECC cluster contains 155 columns×496 rows of data, and is divided into four LDC (long distance code) groups and three BIS (burst indicator subcode) groups disposed alternately. Each LDC group has 38 columns, and each BIS group has 1 column. Then, the four LDC groups are extracted from the ECC cluster to form LDC cluster and the three BIS groups are also derived from the ECC cluster to form BIS cluster. After de-interleaving, the LDC cluster is mapped to LDC block, and the BIS cluster is mapped to BIS block. The LDC block has 304 codewords and each LDC codeword is of a length of 248 bytes including 216 bytes of data and 32 bytes of parity. The BIS block has 24 codewords and each BIS codeword is of a length of 62 bytes including 30 bytes of information and 32 bytes of parity. The LDC and BIS blocks are used for ECC decoding.

Figure 3:
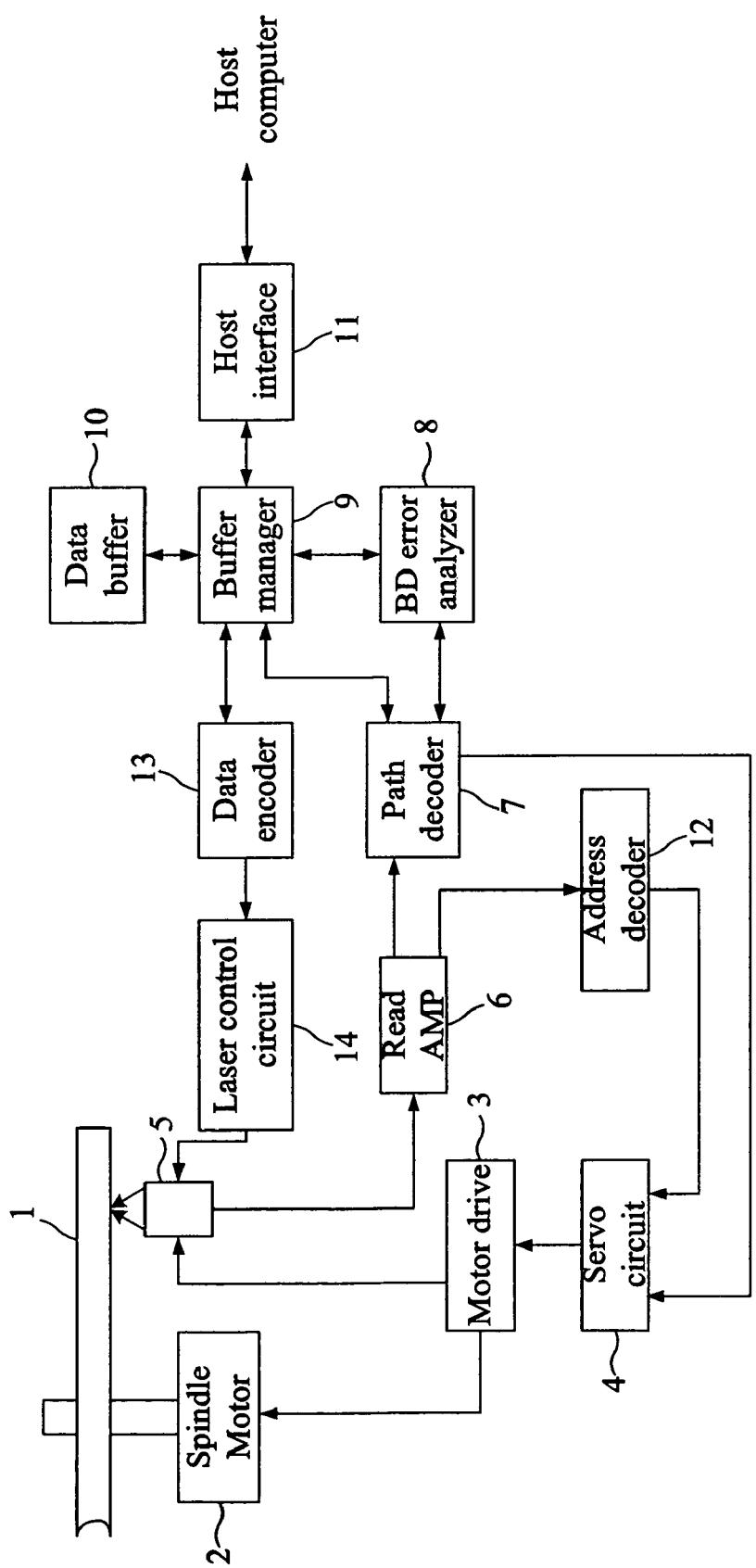
FIG. 3 is a block diagram generally showing a recording and reproduction apparatus with an error analyzer in accordance with the present invention.

FIG. 3 shows a recording and reproduction apparatus with an error analyzer in accordance with the present invention. As shown, an optical disc 1 is rotated by a spindle motor 2, which is driven by a motor driver 3 The motor driver 3 is controlled by a servo circuit 4 Å pick-up head 5 used to read/write the optical disc 1 is also controlled by the servo circuit 4 via the motor driver 3. In reading, data read from the optical disc 1 by the pick-up head 5 are amplified by an amplifier 6 and are fed into a data decoder 7 and an address decoder 12 In the data decoder 7, demodulation, de-interleaving operation as shown in FIG. 2 and error correction are carried out. The address decoder 12 derives address information recorded on the optical disc 1 The decoded data and address information are fed back to the servo circuit 4. A buffer manager 9 stores the decoded data into a data buffer 10, and transfers the decoded data to a host computer via a host interface 11. To record data to the optical disc 1, data are sent to a data encoder 13. The data encoder 13 affixes ECC codes to the data to be recorded and performs interleaving operation and modulation to the data. The encoded data are then written to the optical disc 1 by the pick-up head 5. The power of the pick-up head 5 is controlled by a laser control circuit 14. In accordance with the present invention, the apparatus includes an error analyzer 8. The details of the error analyzer 8 will be further described later.

Figure 4A:
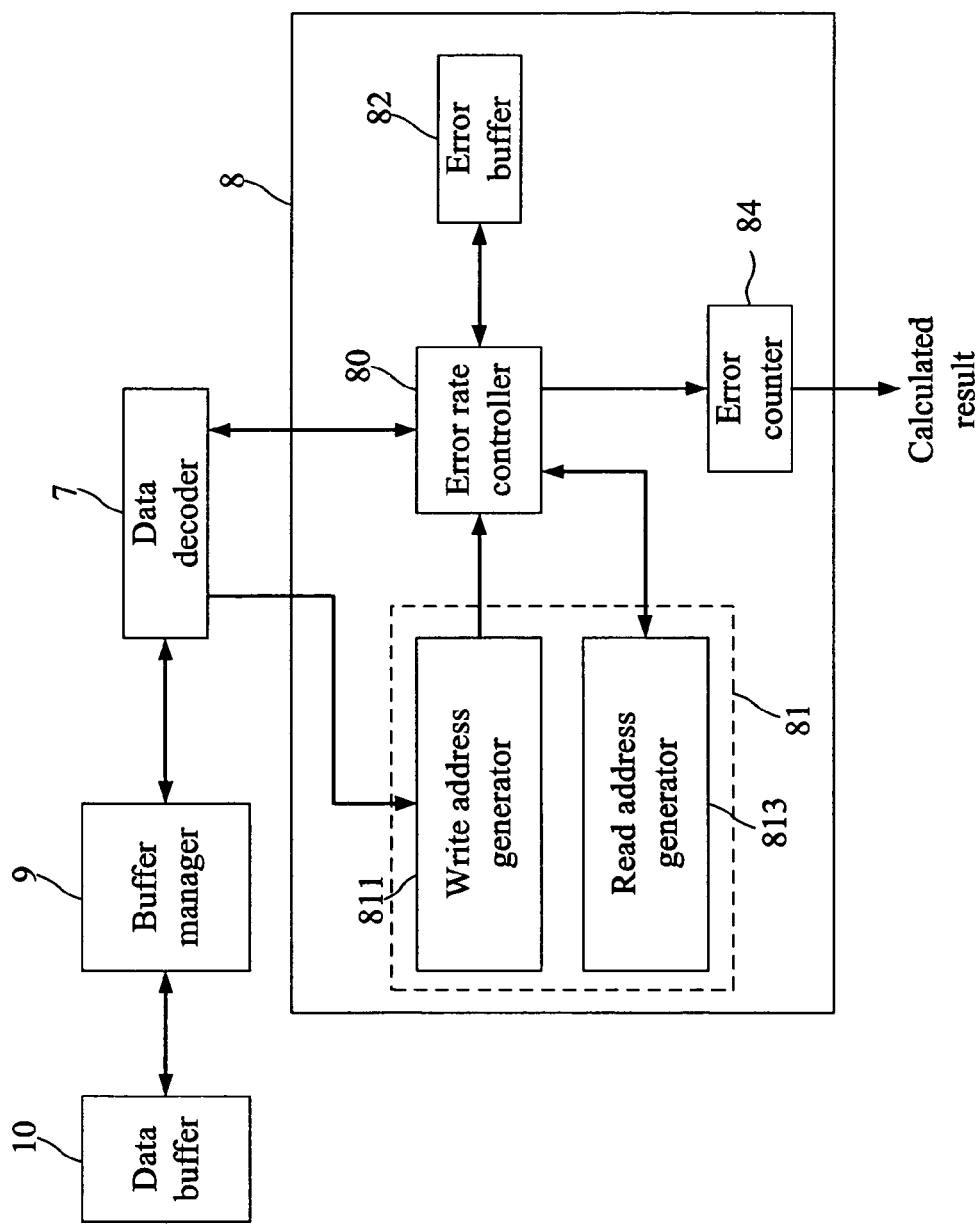
FIG. 4A is a block diagram generally showing a structure of the error analyzer in accordance with an embodiment of the present invention.

FIG. 4A is a block diagram generally showing a structure of the error analyzer 8 in accordance with an embodiment of the present invention. The error analyzer 8 includes an error rate controller 80, an interleave unit 81, an error buffer 82 and an error counter 84.

During data reproduction, the decoding results including error flags (bits) and no-solution flags (bits) generated by the data decoder 7 are stored into the error buffer 82. The error flag indicates if a codeword has an error. The no-solution flag indicates if the error cannot be solved.

An error rate controller 80 of the error analyzer 8 accesses the error flags and the no-solution flags from the error buffer 82 for calculation of random error rate and burst error rate of each ECC cluster. An interleave unit 81 has a write address generator 811 and a read address generator 813. The writing address generator 811 generates write addresses for the error flags and no-solution flags to be stored in an error buffer 82 in a sequence order according to the codeword numbers and/or error location numbers from the data decoder 7. The reading address generator 813 generates access addresses to fetch the error flags and no-solution flags stored in the error buffer 82 according to a sequence order corresponding to the sequence order of the data recorded on the disc. After the error flags and no-solution flags are stored in and read from the error buffer 82 according to the write addresses generated by the write address generator 811 and the access addresses generated by the read address generator 813, those flags are disposed as the format of the ECC data before de-interleaving. The error counter 84 calculates the total error numbers, the total random error number or total burst error number under the control of the error rate controller 80. In a normal situation, the total error number equals to the sum of the total random error number and the total burst error number. The symbol error rate (SER) and the random symbol error rate (RSER) can be obtained based on the total error number, the total random error number and the total burst error number.

The error rate controller 80 receives the error flags and no-solution flags from the data decoder 7 and stores the flags to the error buffer 82 according to the write addresses generated by the write address generator 811. When the data decoder 7 completely decodes an ECC cluster, the error rate controller 80 triggers the read address generator 813 to generate access addresses, so as to fetch the flags stored in the error buffer 82 according to a sequence order corresponding to the sequence order of the data recorded on the disc 1. An error counter 84 counts the flags. After the error rate controller 80 fetches the error flags and no-solution flags of the complete ECC cluster for calculating the SER and/or RSER, the location of the error buffer 82 occupied by the flags of the ECC cluster is released, so that the error flags and no-solution flags of the next ECC cluster from the data decoder 7 can be stored therein. When the error buffer 82 has sufficient space to store error flags and no-solution flags of the next ECC cluster, for example, the error rate controller 80 informs the data decoder 7 to continue decoding the data reproduced from the optical disc 1. Otherwise, the error rate controller 80 requests the data decoder 7 to suspend decoding. Further, when the error buffer 82 receives error flags and no-solution flags of a complete ECC cluster, for example, the error rate controller 80 notifies the error counter 84 to calculate the total error number, and the total random error number or total burst error number. Otherwise, the error rate controller 80 requests the error counter 84 stops calculating. Although a complete ECC cluster is used herein as a unit to start or stop these operations, the present invention is not limited to this. Other units can be also used as desired. The boundary of an ECC cluster should be obtained in order to analyze the error configuration.

Figure 4B:
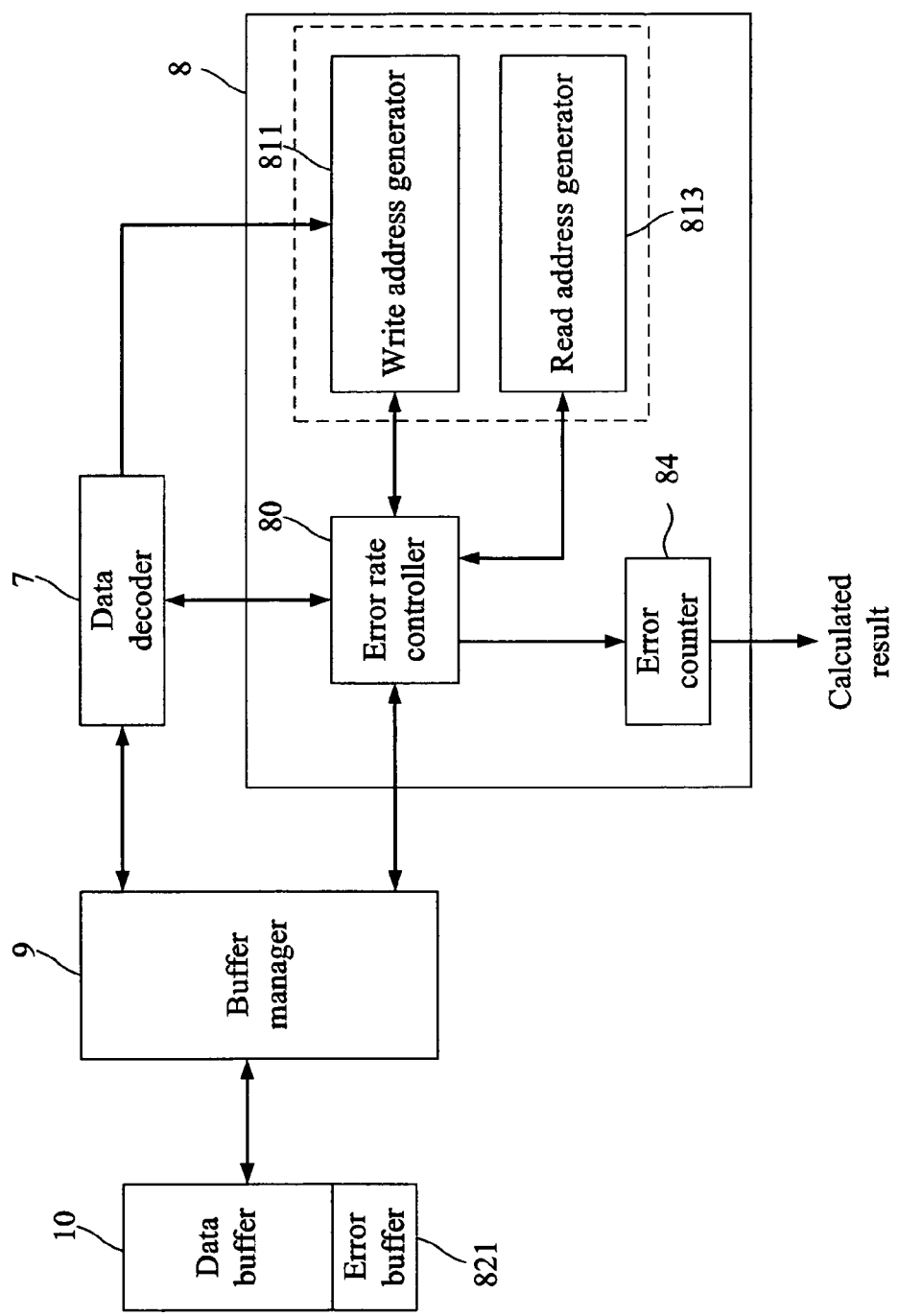
FIG. 4B is a block diagram generally showing a structure of the error analyzer in accordance with another embodiment of the present invention.

FIG. 4B is a block diagram generally showing a structure of the error analyzer in accordance with another embodiment of the present invention. The essential difference between this embodiment and the embodiment shown in FIG. 4A is that the error buffer 82' is combined with the data buffer 10. That is, the data buffer 10 is divided out a portion to be used as the error buffer 82'. In the present embodiment, accessing to the error buffer 82' is performed via the buffer manager 9.

As described above, the interleave unit 80 executes a re-interleaving operation to the error flags and the no-solution flags of an ECC cluster, so that the error flags and the no-solution flags are disposed in a format as the data recorded on the optical disc 1. Accordingly, not only the number of the errors can be counted, but also the distribution of the errors can be observed. The SER and RSER can be calculated accordingly.

The address generation will be further described in detail. For a blu-ray disc example, the buffer 82 should be divided into four parts: an LDC error buffer for storing error flags of the LDC cluster, an LDC no-solution flag buffer for storing no-solution flags of the LDC cluster, a BIS error buffer for storing error flags of the BIS cluster, and a BIS no-solution flag buffer for storing no-solution flags of the BIS cluster.

Figure 5:
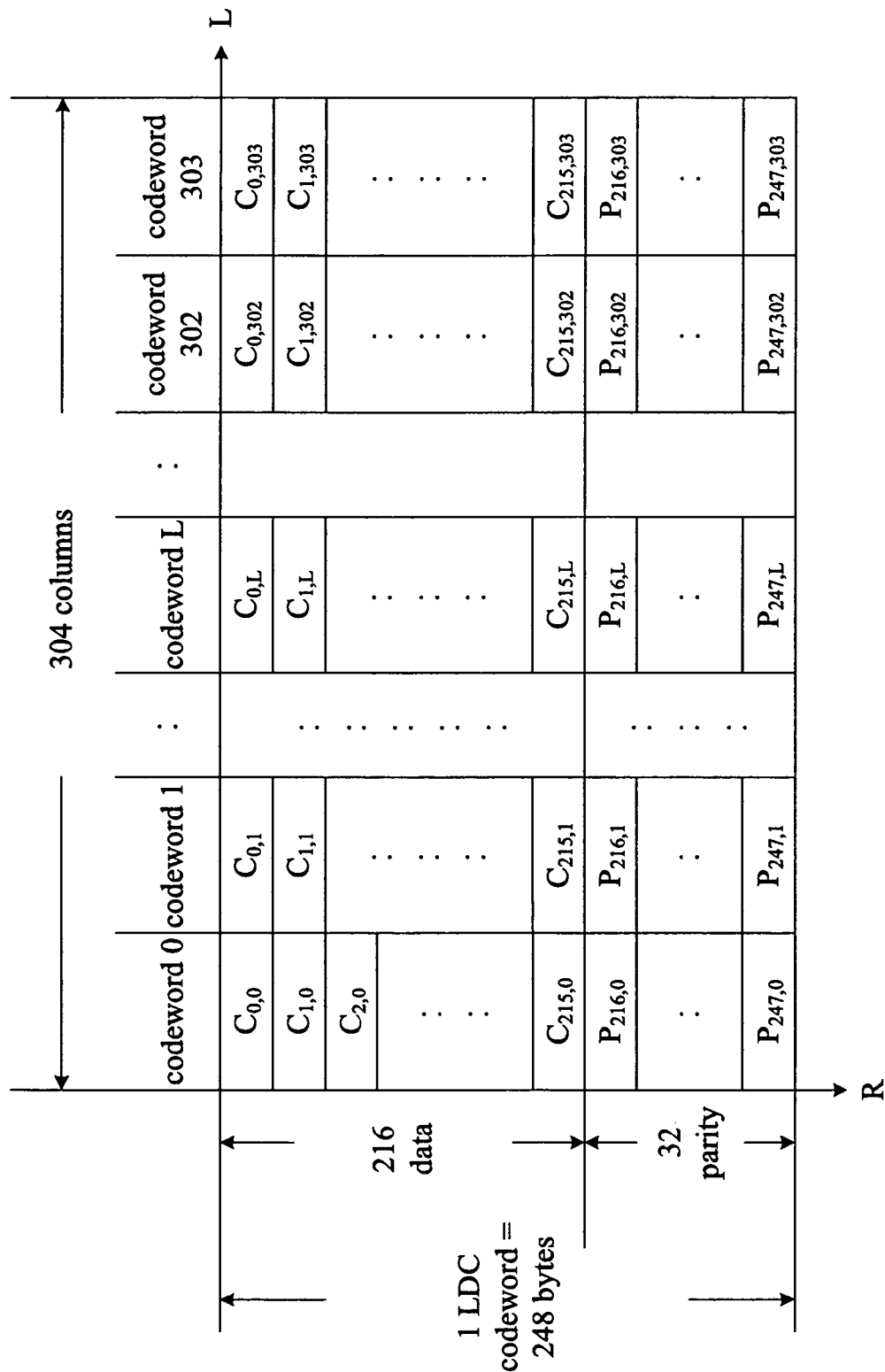
FIG. 5 shows a configuration of an LDC block of a Blu-ray disc.

FIG. 5 shows a configuration of an LDC block of a Blu-ray disc, the LDC block is to be decoded by the data decoder 7. As shown, the 216 data bytes in a column L of the LDC block are numbered from the top as codeword numbers: $C_{0,L}$, $C_{1,L}$, $C_{2,L}$, ..., $C_{215,L}$, where L is the column number between 0 to 313. Each column of the LDC block further has 32 parity bytes, which are numbered as $P_{216,L}$, $P_{217,L}$, $P_{218,L}$, ..., $P_{247,L}$.

Figure 6:
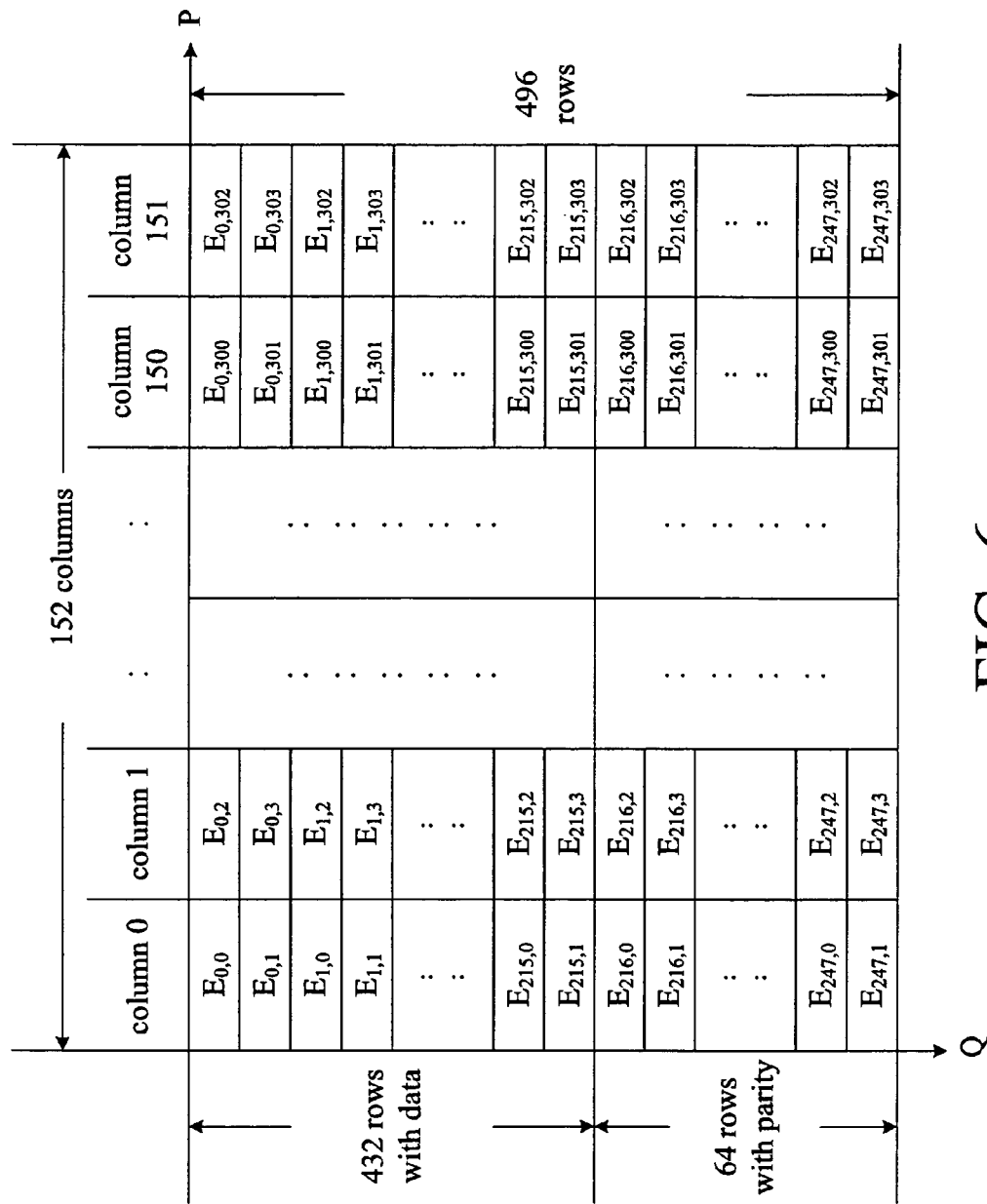
FIG. 6 shows a configuration of an LDC cluster error flag map.

FIG. 6 shows a configuration of a LDC error flag (bit) map. In the present embodiment, error flags are written to the buffer 82 in the format of the error flag map as a first interleaving stage. The first interleaving stage can be mathematically represented by the following formulas. The error flag (bit) $E_{R,L}$ of the byte $C_{R,L}$ or $P_{R,L}$ of the LDC Block shown in FIG. 5 is written to the LDC error buffer as:

| | | | |
|---|---|---|---|
| For row: | $Q = 2 \times R + \mathrm{mod}(L, 2)$ | $0 \leq Q \leq 495$ | (3) |
| For column | $P = \mathrm{div}(L, 2)$ | $0 \leq P \leq 151$ | (4) | where R is the row number of the LDC block, Q and P are respectively the row and column numbers of the LDC Cluster at the first interleaving stage.

Figure 7:
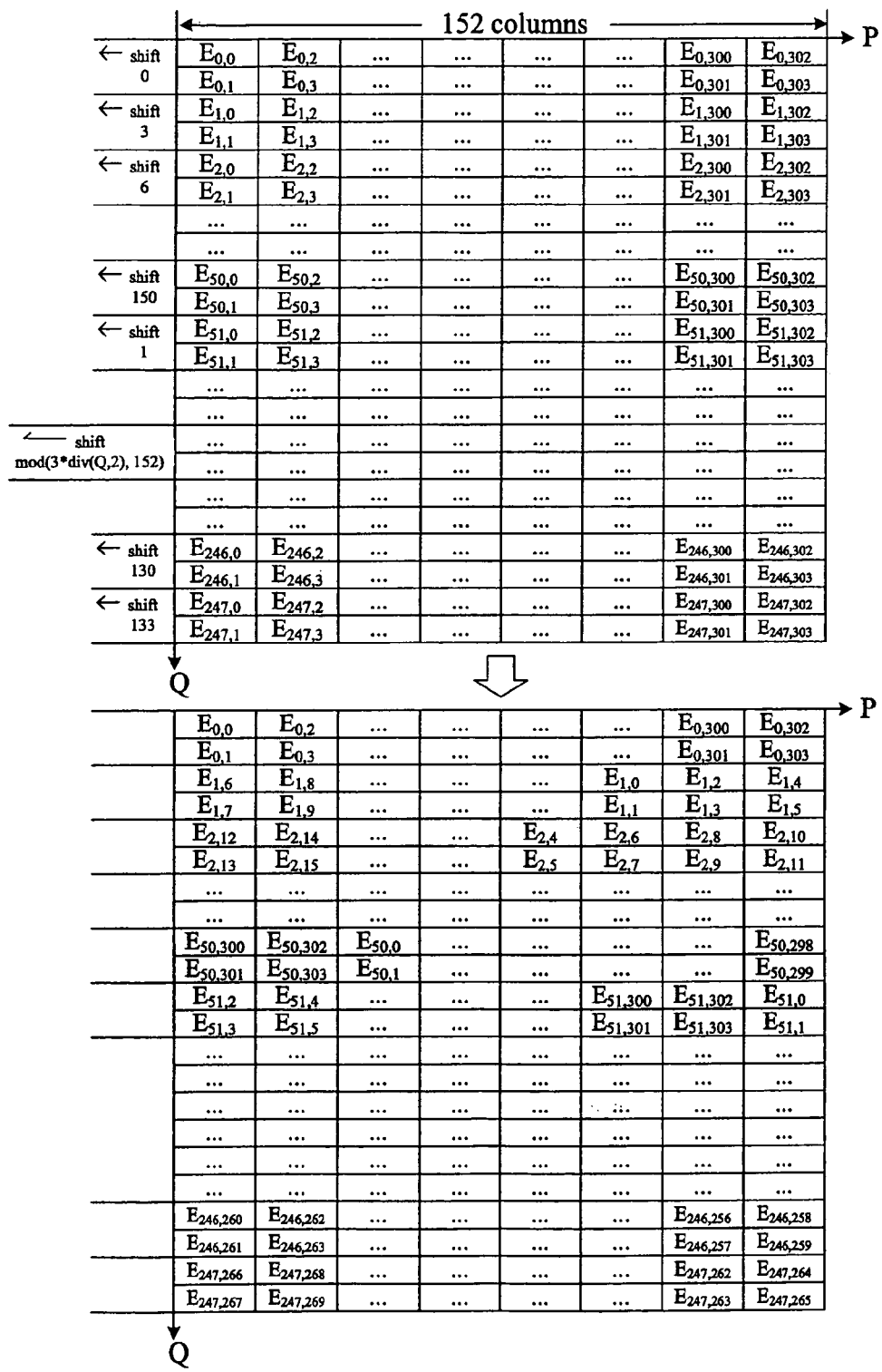
FIG. 7 shows the LDC cluster error flag map of FIG. 6 processed by a two-step interleaving operation in accordance with the present invention.

The error flags (bits) stored in the LDC error buffer are then read out in a second interleaving stage. FIG. 7 shows the LDC cluster error flag map of FIG. 6 processed by the second interleaving stage. In the second interleaving stage, each of the error flags is shifted over $\mathrm{mod}(3 \times \mathrm{div}(Q,2), 152)$ units to the left, and the error flags shifted out of the left side are re-filled in the array from the right side. The read address generator 813 generates addresses so that the error rate controller reads out the error flags according to the sequence achieved by the second interleaving stage. The LDC error flags are stored in the LDC error buffer and are fetched by calculating the read addresses, which will be described further, to execute the second interleaving stage.

The addresses generated by the read address generator 813 start incrementally from the first row (Q=0) to the last row (Q=495). For each row, the addresses for the error flags to be read out start from $\mathrm{mod}(3 \times \mathrm{div}(Q,2), 152)$ and are incrementally counted up to 151 with a step of 1, and then are counted from 0 to $\mathrm{mod}(3 \times \mathrm{div}(Q,2), 152)-1$. In this way, the error flags stored in the LDC error buffer are read out in a sequence consistent with the recording sequence for error calculation.

Figure 8:
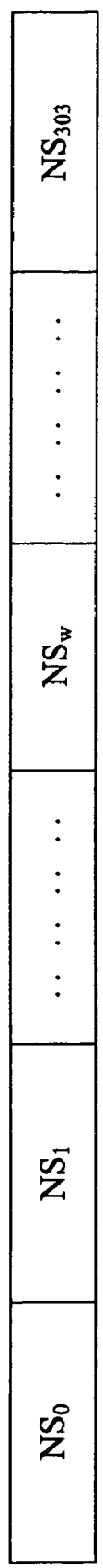
FIG. 8 shows a configuration of a LDC no-solution bit map.

FIG. 8 shows a configuration of a LDC no-solution flag (bit) map. In FIG. 8, the 304 no-solution flags (bits) in the LDC no-solution flag map are numbered starting from the left as $NS_0$, $NS_1$, ..., $NS_L$, ..., $NS_{303}$, which corresponds to the 304 codewords in the LDC Block. Mathematically, when the error flag $E_{q,p}$ is read out from the LDC error buffer for error calculation, the corresponding no-solution flag $NS_w$ from the LDC no-solution bit buffer is also read out. The relationship between the LDC error flag $E_{q,p}$ and the LDC no-solution flag $NS_w$ could be represented by the following formulas:

$$w = 2 \times p + \mathrm{mod}(q, 2) \qquad (5)$$

where w is the corresponding LDC codeword number ranging from 0 to 303

The algorithms above are described for exemplification. Other algorithms can also be used. For example, if the final format of the LDC error flag map is achieved in the first interleaving stage, that is, the LDC error flags are written to the LDC error buffer in the format shown as the lower format in FIG. 7, then in the second interleaving stage, the LDC error flags only need to be sequentially read out.

Figure 9:
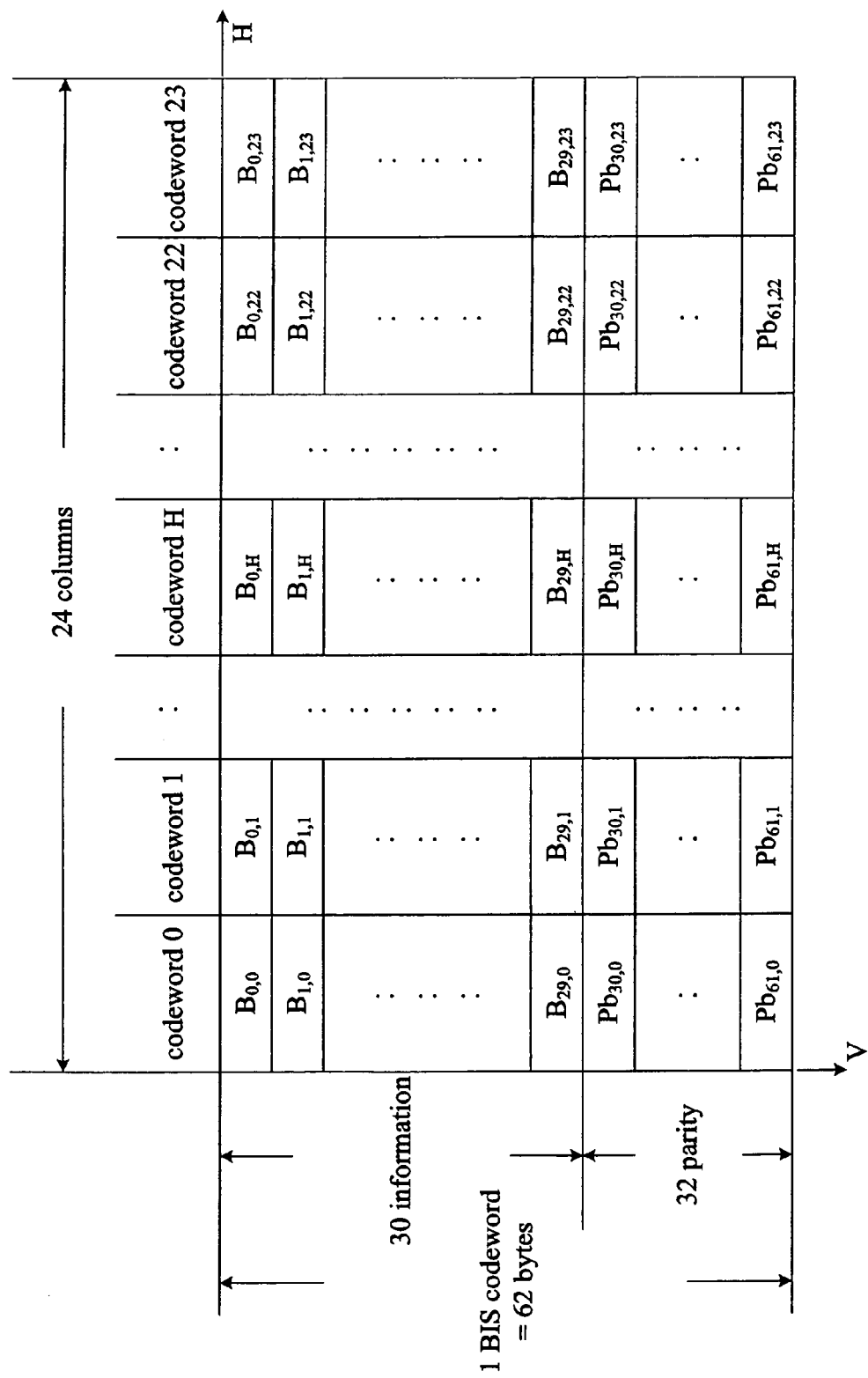
FIG. 9 shows a configuration of a BIS block of a Blu-ray disc.

FIG. 9 shows a configuration of a BIS Block to be decoded by the data decoder 7. As shown, the 30 information bytes in each column of the BIS Block are numbered in a sequence starting from the top of each column as $B_{0,H}$, $B_{1,H}$, $B_{2,H}$, ..., $B_{29,H}$, where H is the BIS codeword number, that is the column number (0 to 23). Each column of the BIS Block is provided with 32 parity bytes according to a long distance RS code. The parity bytes are numbered as: $Pb_{30,H}$, $Pb_{31,H}$, $Pb_{32,H}$, ..., to $Pb_{61,H}$.

Figure 10:
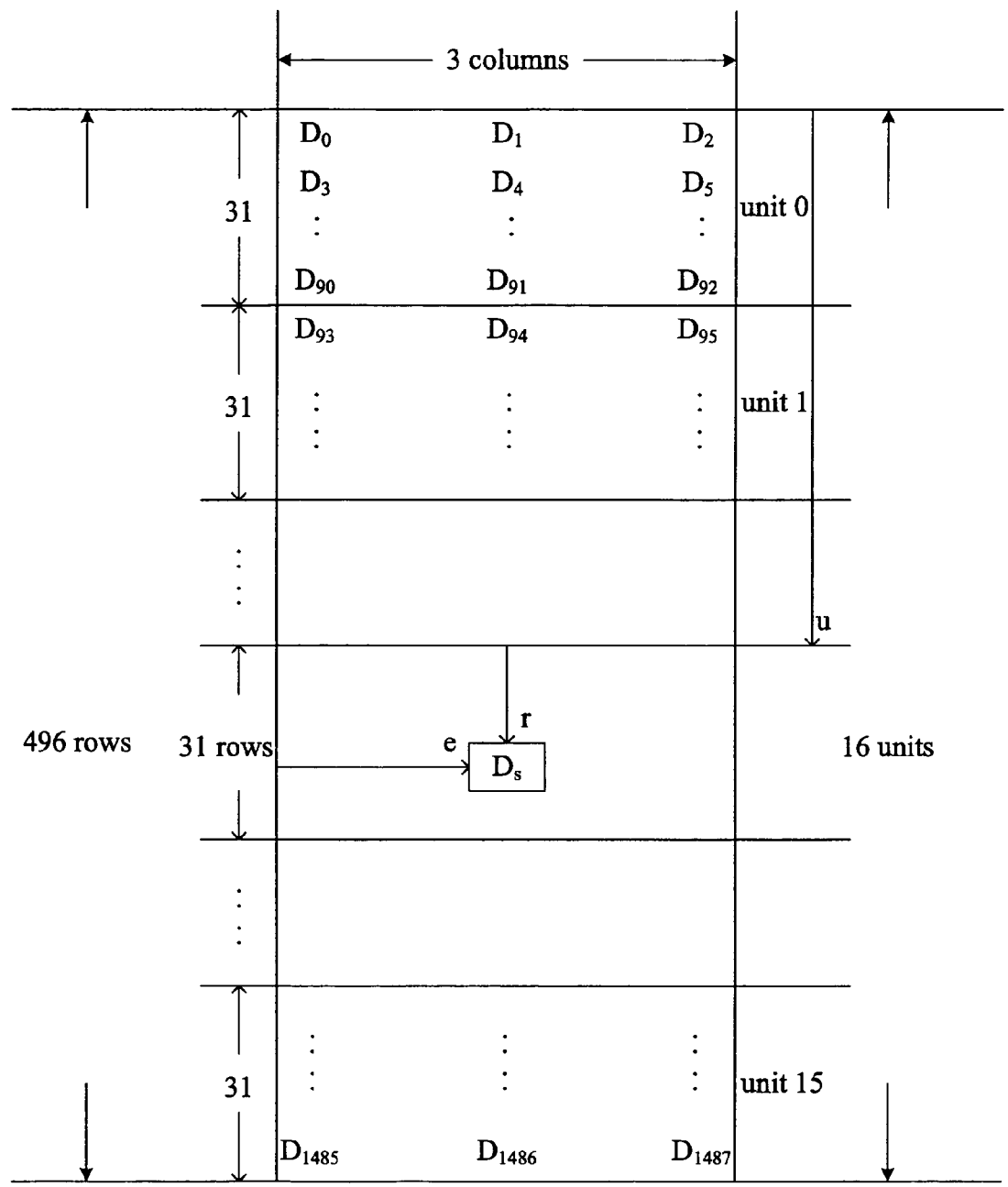
FIG. 10 shows a configuration of BIS cluster error flag map.

FIG. 10 is a view showing a configuration of a BIS error flag map. As shown, the error flag map corresponds to a BIS Cluster map. Mathematically, the interleaving of the BIS error flags in a format of a BIS block into a format of a BIS cluster can be represented by the following formulas. The error flag $D_{V,H}$ of the byte $B_{V,H}$ or $Pb_{V,H}$ of the BIS Block (see FIG. 9) is stored in BIS error buffer as:

| For unit | $u = \mod(\{\div(V, 2) + 8 - \div(H, 3)\}, 8) + 8 \times \mod(V, 2)$ | (6) |
| For row | $r = \div(V, 2)$ | (7) |
| For column | $e = \mod(\{H + \div(V, 2)\}, 3)$ | (8) | where V is the corresponding row number (0 to 61) of the BIS Block.

The error flag number s, giving the sequence number of the error flag $D_S$, of the BIS block to be interleaved in the sequence of the corresponding BIS Cluster written to the disc, is:

$$s = (u \times 31 + r) \times 3 + e \quad (9)$$

The error flag number is the sequential reading address to fetch the BIS error flag stored in the buffer for error calculation. The value of the error flag number s starts from 0 and ends at 1487, which is the sequence order for the data to be recorded to the disc.

Figure 11:
FIG. 11 shows a configuration of a BIS no-solution bit map.

FIG. 11 shows a configuration of a BIS no-solution flag map. As shown, the 24 no-solution flags in the BIS no-solution flag map are numbered starting from the left as $NSb_0$, $NSb_1, \ldots, NSb_H, \ldots, NSb_{23}$, which corresponds to the 24 codewords in the BIS Block. When the error flag $D_s$ is read out from the BIS error buffer for error calculation, the corresponding no-solution flag $NSb_t$ is also read out from the BIS no-solution flag buffer. The relationship between the BIS error flag number s and the BIS no-solution flag number t could be drawn by the following deductive equations:

$$u = \div(s, 93) \quad (10)$$

$$r = \div(\mod(s, 93), 3) \quad (11)$$

$$e = \mod(\mod(m, 93), 3) \quad (12)$$

$$t = \mod(24 - 3 \times \mod(u, 8) + 3 \times (r + \div(((2 \times e) + \mod(r, 3)), 3)) + e - \mod(r, 3), 24) \quad (13)$$

where t is the corresponding BIS codeword number ranging from 0 to 23.

Figure 12:
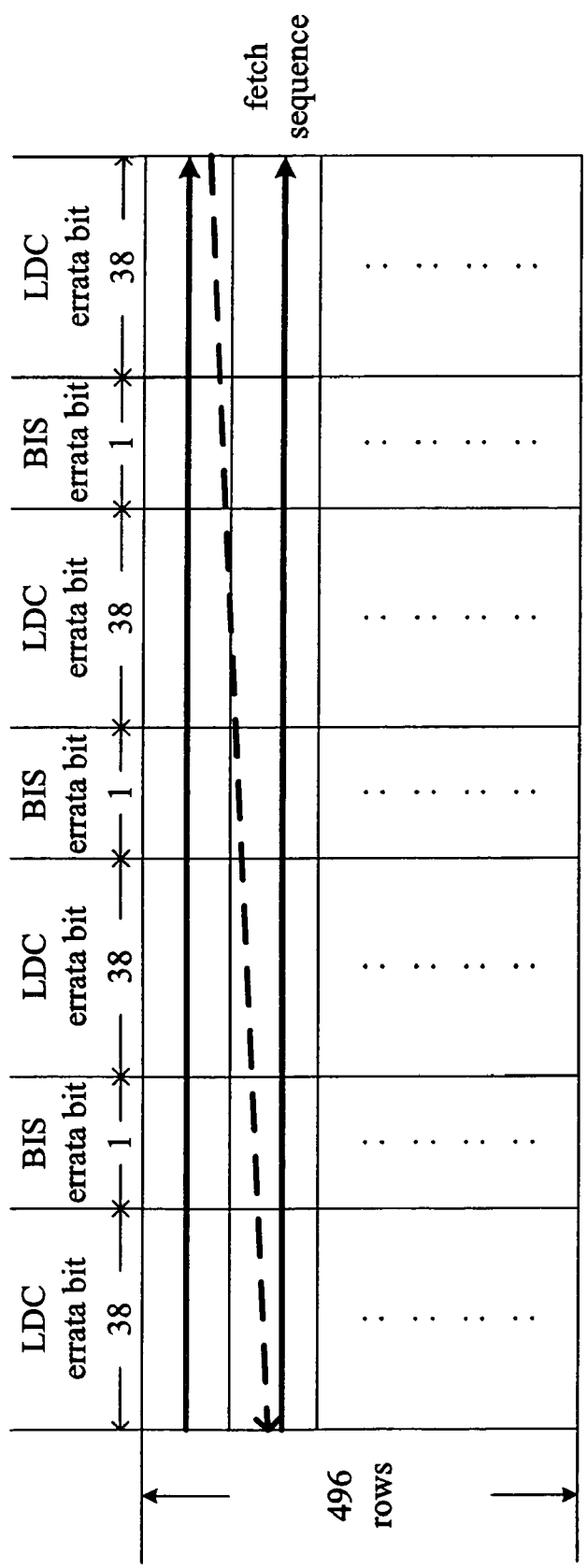
FIG. 12 illustrates a fetch sequence of the LDC error flags and BIS error flags.

Returning to FIG. 2, the ECC cluster is constructed by multiplexing the LDC cluster and BIS cluster. Similarly, the LDC error flags read from the LDC error buffer are split into 4 groups, and each group has 38 columns. Then, 3 columns of the BIS error flags from the BIS error buffer are respectively inserted between the LDC error flag groups, so that the LDC error flag groups and the BIS error flags are alternately disposed, as shown in FIG. 12.

To simplify the complexity of the error analyzer 8, the errors of the BIS cluster may be neglected because there are only 3 bytes of BIS data in a recording frame of 155 bytes, as shown in FIG. 2. In this situation, only the error flags of the LDC cluster are considered in error calculation. Hence, the SER represented by the formula (1) is reduced as $$SER = \frac{\sum_{i=1}^{N} \text{number of erroneous bytes in } LDC \text{ Cluster } i}{N \times M_{LDC}} \quad (14)$$

Here, $M_{LDC}$ is the total number of data bytes in one LDC cluster. For example, under the Blu-Ray standard, the total number of data bytes in one LDC cluster is 75392, and hence $M_{LDC}$ is 75392.

In addition, the RSER represented by the formula (2) is reduced as:

$$RSER = \frac{\sum_{i=1}^{N}(\text{number of all erroneous bytes} - \text{number of all erroneous bytes in bursts} \geq n \text{ bytes}) \text{ in } LDC \text{ Cluster } i}{N \times M_{LDC} - \sum_{i=1}^{N} \text{number of all erroneous bytes in bursts} \geq n \text{ bytes in } LDC \text{ Cluster } i} \quad (15)$$

Figure 13:
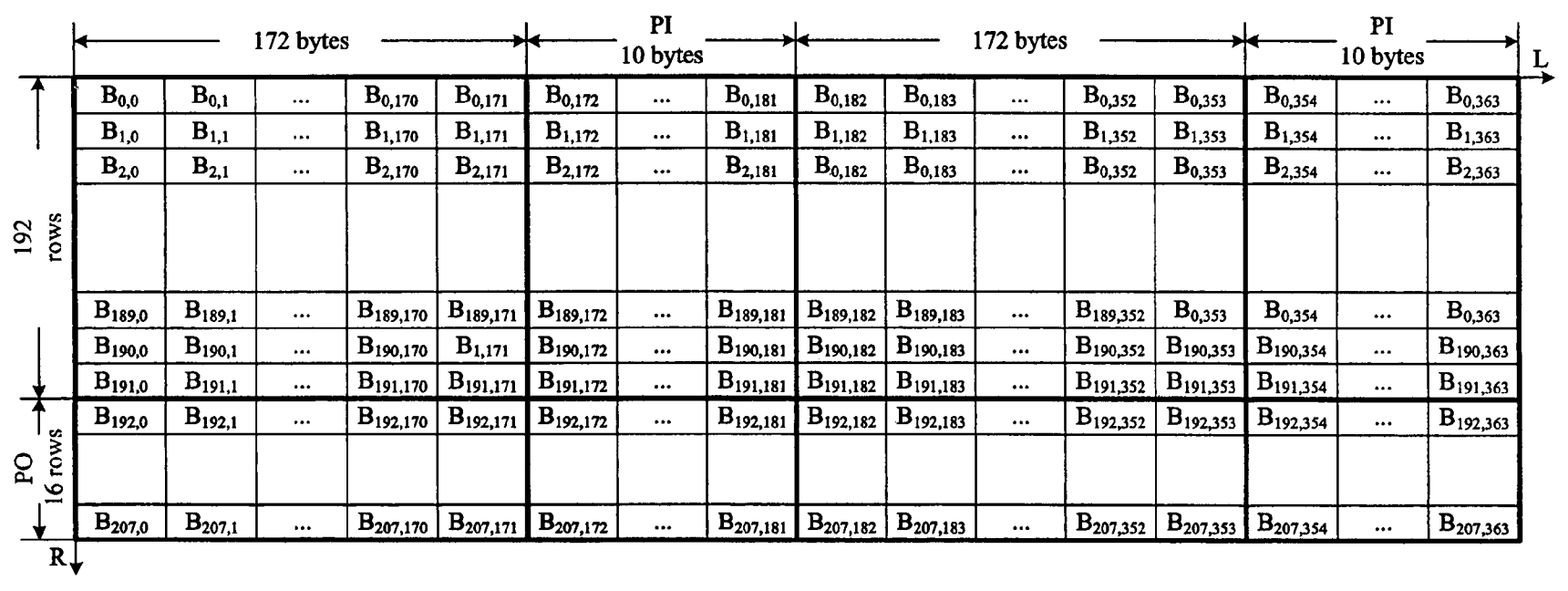

In addition to a blu-ray disc, the present invention is also suitable for other recording mediums, a HD-DVD disc, for example. FIG. 13 shows a configuration of an HD-DVD ECC block to be decoded by the data decoder 7. For each ECC block, the 208 information bytes in each column are numbered starting from the top of each column as $B_{0,L}$, $B_{1,L}$, $B_{2,L}, \ldots, B_{207,L}$, where L represents the column number (0 to 207) of the ECC Block. The 364 information bytes in each row are numbered starting from the left of each row as $B_{R,0}$, $B_{R,1}, B_{R,2}, \ldots, B_{R,363}$, where R represents the column number (0 to 363) of the ECC Block. The ECC Block comprises 172×2×192 bytes information fields, 172×2×16 PO parities of the outer code of RS, and 208×2×10 PI parities of the inner code of RS.

Also, to describe the address generation for the HD-DVD error flag interleaving, the error buffer 82 is divided into three parts: an ECC error buffer for storing the error flags of the ECC block, a PO no-solution flag buffer for storing the PO no-solution flags of the ECC block, and a PI no-solution flag buffer for storing the PI no-solution flags of the ECC block.

FIG. 14 shows a configuration of an ECC error flag map. As shown, the error flag map corresponds to an ECC Block map after interleaving process. The error flag $G_{R,L}$ corresponding to the byte $B_{R,L}$ of the ECC Block (see FIG. 13) is placed in ECC error buffer according to rules mathematically represented as:

| for row | $R' = 2 \times R + \div(L, 182) + \div(R, 6)$ for $R \leq 191$, and $R' = (2 \times (R - 192) + \div(L, 182)) \times 13 + 12$ for $R > 191$ | (16) |
| for column | $L' = \mod(L, 182)$ | (17) | where R' and L' are row number and column number of the ECC error buffer, respectively. Then, the error flags $G_{R',L'}$ are fetched one by one for error calculation. The fetch sequence of the ECC error buffer is from the top row (R'=0) to the bottom row (R'=415) and is from the left bit (L'=0) to the right bit (L'=181) within each row. When all the 182 bits of a row are fetched completely, the next row is fetched sequentially until all the 416 rows of the ECC block are fetched completely. Hence, the fetch sequence number s is deduced as 182×R'+L'.

Figure 15A:
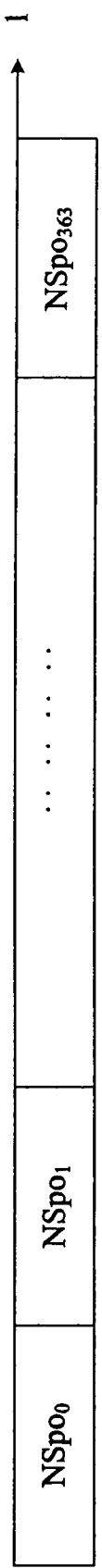
FIG. 15A shows a configuration of a PO no-solution bit map.
Figure 15B:
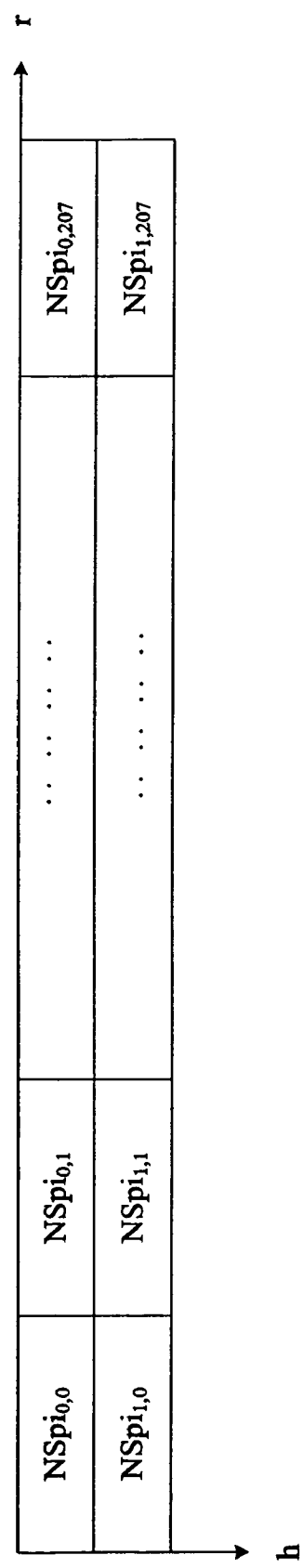
FIG. 15B shows a configuration of a PI no-solution bit map.

FIG. 15 shows a configuration of a PO no-solution flag map and a PI no-solution flag map of the ECC block of the HD-DVD disc. The 364 PO no-solution flags in the PO no-solution flag map are numbered starting from the left as $NSpo_0$, $NSpo_1, \ldots, NSpo_{363}$, which corresponds to the 364 columns in the ECC Block as shown in FIG. 13. The 2×208 PI no-solution flags in the PI no-solution flag map are numbered starting from the left as $NSpi_{0,0}$, $NSpi_{0,1}, \ldots, NSpi_{0,207}$, and $Nspi_{1,0}$, $Nspi_{1,1}, \ldots, Nspi_{1,207}$. The first row of the PI no-solution flag map corresponds to the left half row in the ECC block, and the second row of the PI no-solution flag map corresponds to the right half row in the ECC block as shown in FIG. 13. When the error flag $G_{R',L}$ is read out from the ECC error buffer for error calculation, the corresponding PO no-solution flag $NSpo_1$ and PI no-solution bit $NSPi_{h,r}$ are also respectively read out from the PO no-solution flag buffer and PI no-solution flag buffer. The relationship between the error flag $G_{R',L}$ and the PO no-solution flag $NSpo_1$, as well as the PI no-solution flag $NSPi_{h,r}$ can be derived as follows:

if mod(div(R',13),12)=0 l=L'+182×mod(div(R',13),2)

h=mod(div(R',13),2)

r=192+div(R',13×2)

else if mod(div(R',13),12)≠0 l=L'+182×mod(R'+div(R',13),2)

h=mod((R'−div(R',13)),2)

r=div((R'−div(R',13)),2).                                    (18)

As described above, during reproducing the data from the optical disc, the decoded error information such as error flags and no-solution flags are processed with an interleave operation. Accordingly, the number and distribution of the errors on the disc can be obtained for analysis of the disc quality and/or the recording quality.

While the preferred embodiments of the present invention have been illustrated and described in detail, various modifications and alterations can be made by persons who are skilled in this art. The embodiment of the present invention is therefore described in an illustrative but not restrictive sense. It is intended that the present invention should not be limited to the particular forms as illustrated, and that all modifications and alterations that maintain the spirit and realm of the present invention are within the scope as defined in the appended claims.

What is claimed is:

1. A method for obtaining error information of an optical disc, comprising:
   receiving error flags corresponding to data recorded on the optical disc, wherein the data is recorded in accordance with a recording sequence;
   writing the error flags to an error buffer in a format of an error flag map;
   reading the error flags from the error buffer according to a sequence corresponding to the recording sequence; and
   using the error flags read from the error buffer to obtain information about errors of the optical disc.

2. The method of claim 1, further comprising:
   receiving no-solution flags; and
   writing the no-solution flags to the error buffer;
   wherein when an error flag is read from the error buffer, a corresponding no-solution flag is also read from the error buffer.

3. The method of claim 1, wherein an error flag indicates if a codeword of the data has an error, and wherein a corresponding no-solution flag indicates if the error cannot be solved.

4. The method of claim 1, wherein using the error flags to obtain the information comprises counting the error flags.

5. The method of claim 1, wherein the information about the errors of the optical disc comprises a distribution of the errors.

6. The method of claim 1, wherein the information about the errors of the optical disc comprises a symbol error rate (SER).

7. The method of claim 1, wherein the information about the errors of the optical disc comprises a random symbol error rate (RSER).

8. The method of claim 1, wherein the optical disc is selected from a group consisting of a Blu-ray disc, an HD-DVD, a CD, a DVD+, a DVD-, and a DVD-RAM.

9. The method of claim 1, wherein the method is performed in connection with reproduction of the data on the optical disc;
   wherein during the reproduction of the data a data bit stream read from the optical disc is demodulated into ECC cluster format;
   wherein an ECC cluster comprises M rows×N columns of data;
   wherein x long distance code (LDC) groups are extracted from the ECC cluster to form an LDC cluster;
   wherein y burst indicator subcode (BIS) groups are extracted from the ECC cluster to form a BIS cluster;
   wherein the LDC cluster is mapped to an LDC block;
   wherein the LDC block comprises multiple codewords and each codeword comprises multiple data bytes and multiple parity bytes;
   wherein writing the error flags to the error buffer comprises writing an error flag $E_{R,L}$ of a data byte $C_{R,L}$ or a parity byte $P_{R,L}$ of the LDC block to the error buffer as:

for row $Q=2\times R+\mod(L,2)$ $0\leq Q\leq M-1$ for column $P=\text{div}(L,2)$ $0\leq P\leq N-y-1$;

wherein R and L are respectively row and column numbers of the LDC block; and
   wherein Q and P are respectively row and column numbers of the LDC cluster.

10. The method of claim 9, wherein the error flags are written to an array in the error buffer;
    wherein the array has a left side and a right side;
    wherein reading the error flags from the error buffer according to the sequence that corresponds to the recording sequence comprises shifting each of the error flags over $\mod(3\times\text{div}(Q, 2), N-y)$ units in a left direction; and
    wherein the error flags that are shifted out of the left side of the array are re-filled in the array from the right side.

11. The method of claim 2, wherein the method is performed in connection with reproduction of the data on the optical disc;
    wherein during the reproduction of the data a data bit stream read from the optical disc is demodulated into ECC cluster format;
    wherein multiple long distance code (LDC) groups are extracted from the ECC cluster to form an LDC cluster;
    wherein the LDC cluster is mapped to an LDC block;
    wherein the LDC block comprises multiple codewords;
    wherein a relationship between the error flag $E_{q,p}$ and the corresponding no-solution flag $NS_w$ is expressed as $w=2\times p+\mod(q, 2)$;
    wherein q and p are respectively row and column numbers of the LDC cluster; and
    wherein w is a codeword of the LDC block.

* * * * *